US009680275B2

United States Patent
Houser (10) Patent No.: US 9,680,275 B2
(45) Date of Patent: Jun. 13, 2017

(54) WIRE SINGULATING DEVICE

(71) Applicant: Tyco Electronics Corporation, Berwyn, PA (US)

(72) Inventor: Matthew Steven Houser, Jonestown, PA (US)

(73) Assignee: TE CONNECTIVITY CORPORATION, Berwyn, PA (US)

( * ) Notice: Subject to any disclaimer, the term of this patent is extended or adjusted under 35 U.S.C. 154(b) by 330 days.

(21) Appl. No.: 14/499,941

(22) Filed: Sep. 29, 2014

(65) Prior Publication Data

US 2016/0094002 A1    Mar. 31, 2016

(51) Int. Cl.
  *H01R 43/28*  (2006.01)
  *B65G 11/20*  (2006.01)
  *B21F 23/00*  (2006.01)

(52) U.S. Cl.
  CPC .......... *H01R 43/28* (2013.01); *B21F 23/005* (2013.01); *B65G 11/203* (2013.01)

(58) Field of Classification Search
  CPC ...... H01R 43/28; B21F 23/005; B65G 11/203
  USPC ....................... 414/746.1; 198/463.4; 901/18
  See application file for complete search history.

(56) References Cited

U.S. PATENT DOCUMENTS

| 2,896,379 A | 7/1959 | Herrmann |
| 3,310,301 A | 3/1967 | Netta et al. |
| 3,406,838 A * | 10/1968 | Davidson ............. B21D 53/085 29/726 |
| 6,357,995 B1 * | 3/2002 | O'Hagan ............... B65G 25/02 198/463.5 |

FOREIGN PATENT DOCUMENTS

| DE | 911 347 C | 5/1954 |
| FR | 1 552 281 A | 1/1969 |
| GB | 2 041 899 A | 9/1980 |

OTHER PUBLICATIONS

European Search Report, Mail Date, Feb. 24, 2016, EP 15 18 7053, Application No. 15187053.2-1809.

* cited by examiner

*Primary Examiner* — Scott Lowe (57) ABSTRACT

A wire singulating device includes a stationary plate and a movable plate that define a wire funnel and a wire channel therebetween. The movable plate is movable relative to the stationary plate to control a width of the wire channel. The wire funnel receives a wire bundle that includes plural wires. The wire channel is below the wire funnel and receives the wires from the wire funnel through a top opening in the wire channel. The wire channel directs the wires one at a time to a take away zone below a bottom opening of the wire channel. A wire transfer member below the bottom opening of the wire channel has a slot that receives the wire in the take away zone. The wire transfer member moves relative to the stationary plate and the movable plate to separate the wire in the slot from the wire bundle.

20 Claims, 5 Drawing Sheets

FIG. 8

WIRE SINGULATING DEVICE

BACKGROUND OF THE INVENTION

The subject matter herein relates generally to devices configured to singulate wires from a wire bundle.

Many electrical systems utilize electrical leads to electrically connect electrical components or devices. Electrical leads are typically produced by cutting a segment of wire, stripping one or both ends of the wire, and then crimping a terminal to one or both ends of the wire segment. Known lead-making operations have different levels of automation depending on cost and complexity of the machinery. For example, in a semi-automatic bench machine, a human operator presents wires one at a time to a terminator that crimps a terminal on the end of the wire. In another example, some lead-maker machines are fully automated such that wire is automatically pulled from spools, cut to length, and presented to a specific terminator to receive a pre-selected terminal.

Both types of operations have recognized problems or shortcomings. With the semi-automatic bench machine, for example, the operator has to pull each individual wire from a bundle of wires that may include two hundred wires or more and present each wire to the terminator. The bench machine thus requires significant human intervention to separate or singulate wires from the wire bundle, which limits the efficiency and productivity of the lead-making operation and also requires the expense for operator compensation. The fully-automated lead-maker machines do not require the level of human intervention as the bench machines for singulating wires from a wire bundle, but the lead-maker machines are typically much more complex and expensive than bench machines. For example, a fully-automated lead-maker may be an order of magnitude more costly than a bench machine, so the cost may be prohibitive. A need remains for a wire terminating device that automatically singulates wires from a bundle, is more automated than known bench machines, and is not as complex or expensive as fully-automated lead makers.

BRIEF DESCRIPTION OF THE INVENTION

In one embodiment, a wire singulating device is provided that includes a stationary plate, a movable plate, and a wire transfer member. The stationary plate and the movable plate define a wire funnel and a wire channel therebetween. The wire channel is disposed below the wire funnel. The movable plate is configured to be movable relative to the stationary plate to control a width of the wire channel. The wire funnel receives a wire bundle that includes plural wires. The wire channel has a top opening that receives wires of the wire bundle from the wire funnel. The wire channel directs the wires one at a time to a take away zone below a bottom opening of the wire channel. The wire transfer member is disposed below the bottom opening of the wire channel. The wire transfer member has a slot that aligns with the bottom opening and receives the wire in the take away zone. The wire transfer member is configured to move relative to the stationary plate and the movable plate to separate the wire in the slot from the wire bundle.

In another embodiment, a wire singulating device is provided that includes a stationary plate, a movable plate, and a wire wheel. The stationary plate and the movable plate define a wire funnel and a wire channel therebetween. The wire channel is disposed below the wire funnel. The movable plate is configured to be movable relative to the stationary plate between an open position and a closed position to control a width of the wire channel. The wire funnel receives a wire bundle that includes plural wires. The wire channel has a top opening that receives wires of the wire bundle from the wire funnel. The wire channel directs the wires to a take away zone below a bottom opening of the wire channel. When the movable plate is in the open position, the width of the wire channel allows a first wire in the wire channel to exit the wire channel through the bottom opening and enter the take away zone. The width of the wire channel decreases as the movable plate moves from the open position to the closed position such that the movable plate engages a second wire in the wire channel to retain the second wire in the wire channel. The second wire is adjacent to the first wire. The wire wheel is disposed below the bottom opening of the wire channel. The wire wheel has a slot that aligns with the bottom opening to receive the first wire that enters the take away zone. The wire wheel is configured to rotate relative to the stationary plate and the movable plate to separate the first wire in the slot from the wire bundle.

DETAILED DESCRIPTION OF THE INVENTION

Figure 1:
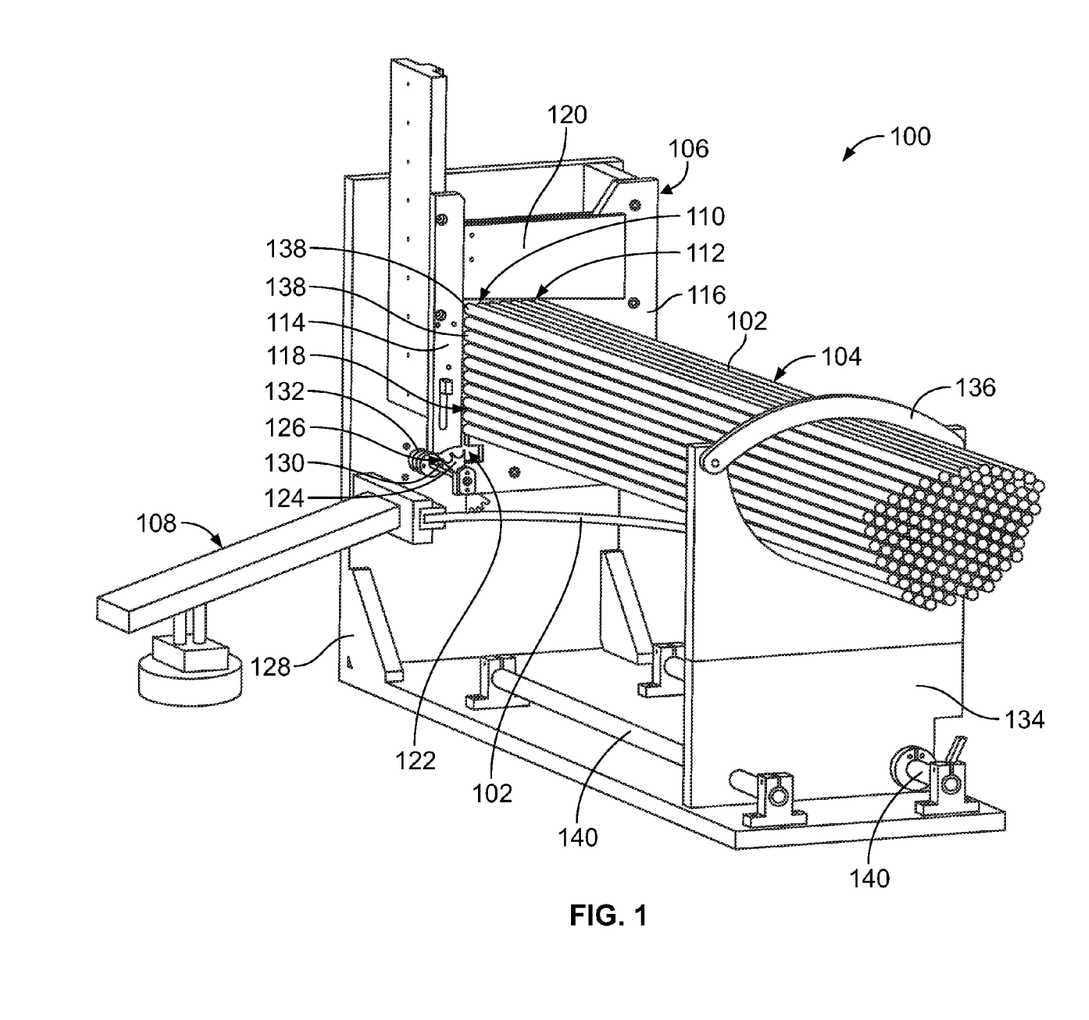
FIG. 1 is a perspective view of a wire singulating system in accordance with an exemplary embodiment.

FIG. 1 is a perspective view of a wire singulating system 100 in accordance with an exemplary embodiment. The wire singulating system 100 is configured to separate individual wires 102 from a wire bundle 104 that includes multiple wires 102. For example, the wire bundle 104 may include hundreds of wires 102 extending generally parallel to each other. The wire singulating system 100 is configured to automatically separate one of the wires 102 at a time for processing, such as cutting the wire 102 to length, prepping the wire 102 for crimping, crimping a terminal (not shown) to the wire 102, or the like. Although the wire singulating system 100 is described herein as separating the individual wires 102 from the wire bundle 104, the wire singulating system 100 may have additional functionality, such as the ability to present the separated individual wires 102 to a terminator (not shown) for crimping or to another processing device or station.

The wire singulating system 100 shown in FIG. 1 includes a wire singulating device 106, the wire bundle 104, and a wire transfer device 108. A distal end 110 of the wire bundle 104 is received in a wire funnel 112 of the wire singulating device 106. The wire funnel 112 is defined between opposing first and second plates 114, 116. A wire channel 118 is disposed below the wire funnel 112. As used herein, relative or spatial terms such as "top," "bottom," "above," "below," "left," "right," "front," and "rear" are only used to distinguish the referenced elements and do not necessarily require particular positions or orientations in the wire singulating system 100 or in the surrounding environment of the wire singulating system 100. The wire funnel 112 opens into the wire channel 118 such that wires 102 in the wire funnel 112 are guided into the wire channel 118. In an embodiment, the wire singulating device 106 includes a weight 120. The weight 120 extends across the wire funnel 112 between the first and second plates 114, 116. The weight 120 is configured to engage the wire bundle 104 from above to apply a force on the wire bundle 104 towards the wire channel 118. The weight 120 forces individual wires 102 of the wire bundle 104 into the wire channel 118. The weight 120 may also act as a clamp to hold the wire bundle 104 in the wire funnel 112.

The wire singulating device 106 is configured to present one wire 102 at a time to a take away zone 122 below the wire channel 118. The take away zone 122 may be directly below the wire channel 118. Each wire 102 may enter the take away zone 122 upon dropping out of the wire channel 118. The wire singulating device 106 further includes a wire transfer member 124 below the wire channel 118. The wire transfer member 124 includes at least one slot 126 along an outer perimeter of the wire transfer member 124. Each slot 126 is configured to receive one of the wires 102 therein. During operation, one of the slots 126 aligns with the wire channel 118. The wire 102 that drops from the wire channel 118 is received within the slot 126 of the wire transfer member 124. For example, the slot 126 is configured to receive the wire 102 that is directed to the take away zone 122. The wire transfer member 124 is mounted to the wire singulating device 106, such as to the first plate 114, the second plate 116, or to a frame 128 of the wire singulating device 106. In the illustrated embodiment, the wire transfer member 124 is mounted to the second plate 116, although the wire transfer member 124 is connected by a drive shaft 130 and a motor 132 to the frame 128. The wire transfer member 124 is configured to move relative to other components of the wire singulating device 106, such as the frame 128, first and second plates 114, 116, and the weight 120. As the wire transfer member 124 moves, the wire 102 in the slot 126 is carried away from the take away zone 122 and from the wires 102 in the wire channel 118 to separate the wire 102 from the wire bundle 104.

In an embodiment, the wire transfer member 124 is a wire wheel that is configured to rotate relative to the first and second plates 114, 116, for example. As used herein, the wire transfer member 124 may be referred to as wire wheel 124. The wire wheel 124 rotates to deliver the separated wire 102 to a device or location for subsequent processing. In the illustrated embodiment, the wire transfer device 108 is configured to grasp the wire 102 once the wire wheel 124 rotates to a set position out of the way of the wire bundle 104 and the first and second plates 114, 116. For example, the wire wheel 124 may rotate counter-clockwise to move the wire 102 in the slot 126 towards the wire transfer device 108 that is located to the left of the wire wheel 124. The wire transfer device 108 may be an automated transfer arm. The wire transfer device 108 may be configured to move the wire 102 to a terminator for crimping to a terminal, to another wire processing device such as a wire stripper or cutter, to a wire storage container, or the like. In an alternative embodiment, the wire wheel 124 may deliver the wires 102 directly to a wire processing device (such as a terminator), to a wire storage container, or the like, instead of to the wire transfer device 108.

In an exemplary embodiment, the wire singulating device 106 is configured to repeatably feed individual wires 102 of the wire bundle 104 through the wire channel 118 to the slot 126 of the wire wheel 124 for the wire wheel 124 to rotate and deliver the wires 102 to the wire transfer device 108. The process may repeat automatically until all of the wires 102 in the wire bundle 104 are individually separated. The automatic wire singulation provided by the wire singulating device 106 may be more efficient than separating the wires 102 manually.

The wire singulating device 106 optionally may include a support wall 134 that is spaced apart from the first and second plates 114, 116 and the wire wheel 124. The support wall 134 is configured to support a portion of the wire bundle 104 away from the distal end 110. The wire bundle 104 may be disposed on top of the support wall 134. The support wall 134 elevates the wire bundle 104 to a set height. The height of the support wall 134 may be the same height as the wire funnel 112 such that the wire bundle 104 extends generally transverse to a plane of the first and second plates 114, 116. The support wall 134 may also include a support wall clamp 136 that engages the wire bundle 104 from above to hold the wire bundle 104 in place on the support wall 134. For example, the clamp 136 provides force on the wire bundle 104 to resist tension and other forces applied on the wires 102 during operation of the wire singulating device 106 to keep ends 138 of the wires 102 aligned with each other. The support wall 134 and support wall clamp 136 may be movable along a support wall track 140 on the frame 128. The support wall track 140 extends parallel to the wire bundle 104. The support wall 134 and the support wall clamp 136 may be moved towards and/or away from the first and second plates 114, 116 to adjust an amount of slack or tension in the wire bundle 104 between the support wall 134 and the first and second plates 114, 116.

Figure 2:
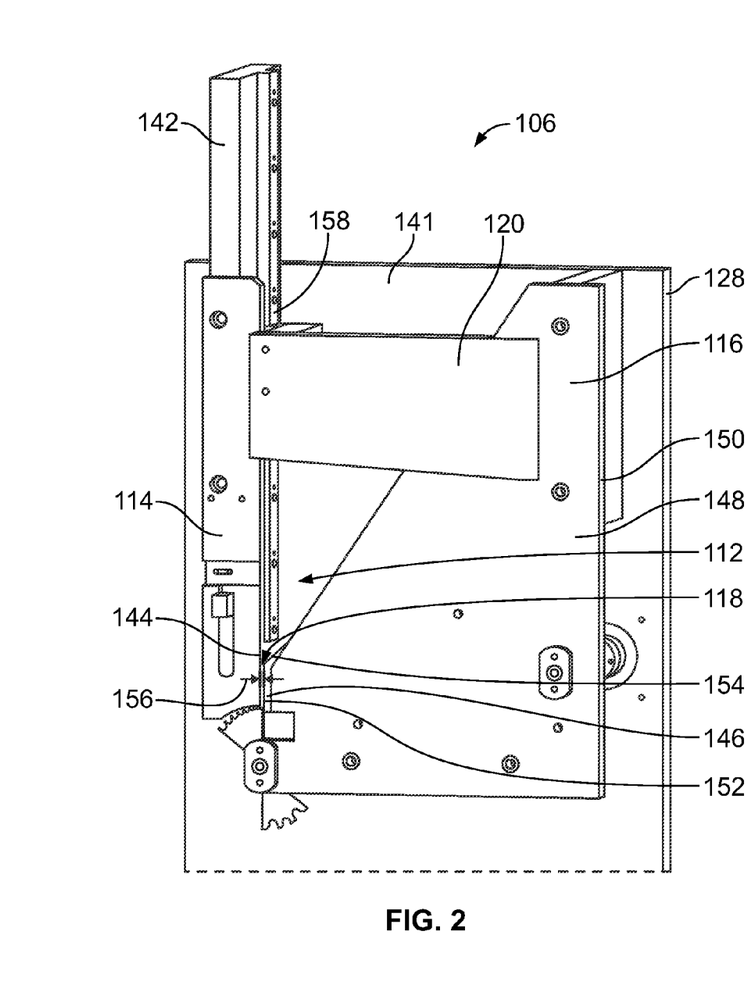
FIG. 2 is a perspective view of a portion of a wire singulating device according to an embodiment.

FIG. 2 is a perspective view of a portion of the wire singulating device 106 according to an embodiment. The first plate 114 is a stationary plate 114. The stationary plate 114 is fixedly mounted to a back wall 141 of the frame 128 via a beam 142. The stationary plate 114 includes an inner wall 144. The inner wall 144 defines a left side of the wire funnel 112 and a left side of the wire channel 118 below the wire funnel 112. The inner wall 144 is linear in the illustrated embodiment such that the portion of the inner wall 144 defining the wire funnel 112 is continuous and co-planar with the portion of the inner wall 144 defining the wire channel 118. In an alternative embodiment, however, the portion of the inner wall 144 defining the wire funnel 112 may be angled relative to the portion defining the wire channel 118.

In the illustrated embodiment, the second plate 116 is a stacked plate assembly 116 that includes a movable plate 146 sandwiched between a front plate 148 and a back plate 150. The back plate 150 is disposed between the movable plate 146 and the back wall 141 of the frame 128. The front and back plates 148, 150 are stationary and are fixed to the frame 128. The movable plate 146 is mounted to the front and back plates 148, 150, but is configured to move relative to the front and back plates 148, 150. In an embodiment, the movable plate 146 defines a right side of the wire channel 118 and at least a portion of a right side of the wire funnel 112. For example, the movable plate 146 extends beyond the front and back plates 148, 150 toward the stationary plate 114 to define the right side of the wire channel 118 and at least a portion of the wire funnel 112. The movable plate 146 has a wire channel wall 152 that defines the right side of the wire channel 118 and a wire funnel wall 154 that defines at least part of the right side of the wire funnel 112. In the illustrated embodiment, the wire funnel wall 154 extends from the wire channel wall 152 and is angled away from the wire channel wall 152 such that the walls 152, 154 are not co-planar. The wire funnel wall 154 slopes away from the wire channel wall 152 such that the wire funnel 112 is wider than the wire channel 118 and a width of the wire funnel 112 increases proportionately with height away from the wire channel wall 152 (towards the weight 120).

At least part of the right side of the wire funnel 112 may be defined by the front and/or back plates 148, 150. For example, the wire funnel wall 154 of the movable plate 146 may define a lower portion of the wire funnel 112 proximate to the wire channel 118, and the front and back plates 148, 150 define an upper portion of the wire funnel 154 above the wire funnel wall 154. The sloping wire funnel wall 154 and front and back plates 148, 150 provide a funnel effect that directs the wires 102 (shown in FIG. 1) of the wire bundle 104 (FIG. 1) towards the wire channel 118. In an alternative embodiment, the wire singulating device 106 may be oriented or arranged such that the movable plate 146 is on the left of the stationary plate 114 instead of on the right. Furthermore, in other embodiments, the walls 152, 154 of the movable plate 146 may be continuous and planar while the stationary plate 114 has two different, angled portions that define the wire funnel 112 and the wire channel 118, respectively. Optionally, both the movable plate 146 and the stationary plate 114 have wire funnel walls that extend from and are angled away from respective wire channel walls such that the wire funnel 112 is generally symmetric.

In an exemplary embodiment, the movable plate 146 is configured to move relative to the stationary plate 114 to adjust a width 156 of the wire channel 118. The movable plate 146 moves between an open position and a closed position. The wire channel wall 152 of the movable plate 146 is further from the stationary plate 114 when the movable plate 146 is in the open position than when the movable plate 146 is in the closed position. As a result, the width 156 of the wire channel 118 is greater when the movable plate 146 is in the open position than when the movable plate 146 is in the closed position. In an embodiment, the front and back plates 148, 150 are stationary and thus do not move as the movable plate 146 moves between the open and closed positioned. The movement of the movable plate 146 is described in more detail below with reference to FIGS. 3-5.

The weight 120 that extends across the wire funnel 112 between the stationary plate 114 and the stacked plate assembly 116 is coupled to a track 158 on the beam 142. The track 158 is oriented vertically. The weight 120 is configured to move up and down along the track 158 relative to the stationary plate 114 and the stacked plate assembly 116. The weight 120 may be configured to move downwards along the track 158 towards the wire channel 118 due to the force of gravity. For example, the weight 120 engages a top portion of the wire bundle 104 (shown in FIG. 1) and applies a constant downward force on the wire bundle 104 from above. As the height of the wire bundle 104 in the wire funnel 112 gradually decreases due to the number of wires 102 (shown in FIG. 1) removed from the wire bundle 104, the weight 120 gradually lowers along the track 158 to stay in engagement with the wire bundle 104. As an alternative to using the force of gravity alone, the height of the weight 120 along the track 158 may be controlled by a pneumatic cylinder or the like.

Figure 3:
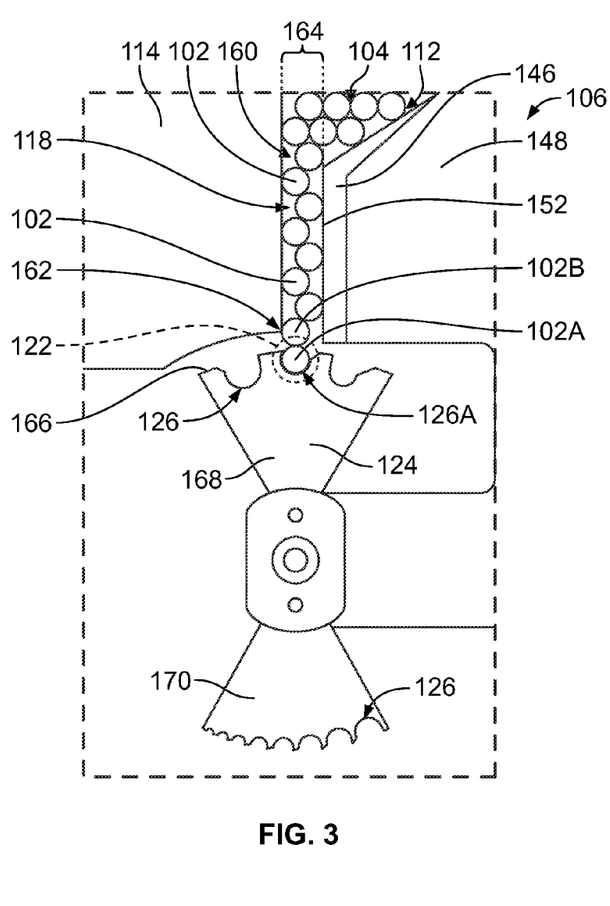
FIG. 3 is a front close-up view of a portion of the wire singulating device and the wire bundle according to an embodiment.

FIG. 3 is a front close-up view of a portion of the wire singulating device 106 and the wire bundle 104 according to an embodiment. In the illustrated embodiment, the movable plate 146 is in the open position. The front plate 148 is in the forefront of the movable plate 146. To better illustrate and describe the movable plate 146, the wires 102 are shown in cross-section. The wire bundle 104 is within the wire funnel 112 and some of the wires 102 of the wire bundle 104 are disposed in the wire channel 118. The wire channel 118 has a top opening 160 and a bottom opening 162. The top opening 160 is fluidly coupled to the wire funnel 112. The wires 102 in the wire channel 118 are received in the wire channel 118 from the wire funnel 112 through the top opening 160. The wires 102 in the wire channel 118 exit the wire channel 118 through the bottom opening 162. The wires 102 that exit through the bottom opening 162 enter the take away zone 122 below the bottom opening 162 of the wire channel 118. The wire 102 in the take away zone 122 is received in a slot 126 of the wire wheel 124.

When the movable plate 146 is in the open position, the wire channel wall 152 of the movable plate 146 is separated from the stationary plate 114 by a first distance 164. The first distance 164 is the width of the wire channel 118 when the movable plate 146 is in the open position. The wire channel 118 is referred to herein as having a first width 164 when the movable plate 146 is in the open position. The location of the movable plate 146 in the open position is determined based on one or more properties of the wires 102 of the wire bundle 104. The properties may include the diameter of the wires 102, the hardness of the insulation layers (not shown) of the wires 102, and the like. For example, the open position of the movable plate 146 is at a location such that the width 164 of the wire channel 118 is greater than a diameter of the wires 102, which allows the wires 102 to move freely through the wire channel 118. Due to gravity and the force applied by the weight 120 (shown in FIG. 2) on the wire bundle 104, the wires 102 in the wire channel 118 are forced downward towards the bottom opening 162 and the take away zone 122. In an embodiment, the width 164 of the wire channel 118 is less than double the diameter of the wires 102 which prevents the wires 102 from arranging side-by-side across the width 164 of the wire channel 118. In an embodiment, the movable plate 146 in the open position is at a location such that the width 164 of the wire channel 118 is about one and a half times the diameter of the wires 102. Thus, the wires 102 are able to freely move through the wire channel 118 but are not able to arrange side-by-side, which could jam the wire singulating device 106. The wires 102 in the wire channel 118 arrange in a single-file line such that the wires 102 are stacked one on top of another between the bottom opening 162 and the top opening 160. The single-file line of wires 102 may not be linear, as shown in FIG. 3. The location of the movable plate 146 may also be based on the hardness of the insulation layers of the wires 102, such that the width 164 may be slightly less for hard wires 102 and slightly greater for more compressible wires 102 to prevent jamming.

In an exemplary embodiment, when the movable plate 146 is in the open position, a first wire 102A that is the lowermost wire 102 in the wire channel 118 is allowed to exit the wire channel 118 through the bottom opening 162 and enter the take away zone 122. In FIG. 3, the first wire 102A is already in the take away zone 122 and is no longer the lowermost wire 102 in the wire channel 118. A second wire 102B that was adjacent to the first wire 102A in the wire channel 118 consequently becomes the lowermost wire 102 in the wire channel 118 when the first wire 102A exits the wire channel 118. Although the wire channel 118 is wide enough to allow the second wire 102B to exit through the bottom opening 162 after the first wire 102A, the second wire 102B is blocked and prevented from exiting the wire channel 118 by the first wire 102A in the take away zone 122. For example, the first wire 102A is received and cradled in the slot 126 of the wire wheel 124 below the bottom opening 162. The second wire 102B, now the lowermost wire 102 in the wire channel 118, engages a top portion of the first wire 102A which blocks further downward movement of the second wire 102B. Therefore, the wire 102 located in the take away zone 122 blocks additional wires 102 from exiting the wire channel 118, so only one wire 102 exits the wire channel 118 at a time (and only that one wire 102 enters the take away zone 122).

The wire wheel 124 in FIG. 3 is in a reception position such that a selected slot 126A is aligned with the bottom opening 162 of the wire channel 118. The slot 126A receives the first wire 102A that is directed to the take away zone 122 from the wire channel 118. The wire wheel 124 has a rounded outer perimeter 166, and multiple slots 126 are defined along the outer perimeter 166. In an embodiment, each slot 126 is configured to receive only one wire 102 at a time. At least some of the slots 126 have different shapes and/or sizes than other slots 126 in order to receive or accommodate wires 102 of different shapes and/or sizes. The slots 126 shown in FIG. 3 are all rounded but have different size diameters. Each of the slots 126 is therefore configured to receive different sizes of wires 102. Typically, the wires 102 in the wire bundle 104 have the same size and shape, so the same slot 126 is used to receive each of the wires 102 of the wire bundle 104 that enter the take away zone 122. In an alternative embodiment, the wire wheel 124 may include multiple slots of the same size and shape as well as multiple slots of different sizes and/or shapes. The wire wheel 124 shown in FIG. 3 has a bow-tie shape. The wire wheel 124 includes a first wedge 168 and an opposite second wedge 170 that are connected at a center or core (not shown). The bow-tie shape may allow the wire wheel 124 to be lighter than a wire wheel 124 having a circular shape. In other embodiments, however, the wire wheel 124 has an elliptical shape, a circular shape, a semi-circular shape, or the like.

Figure 4:
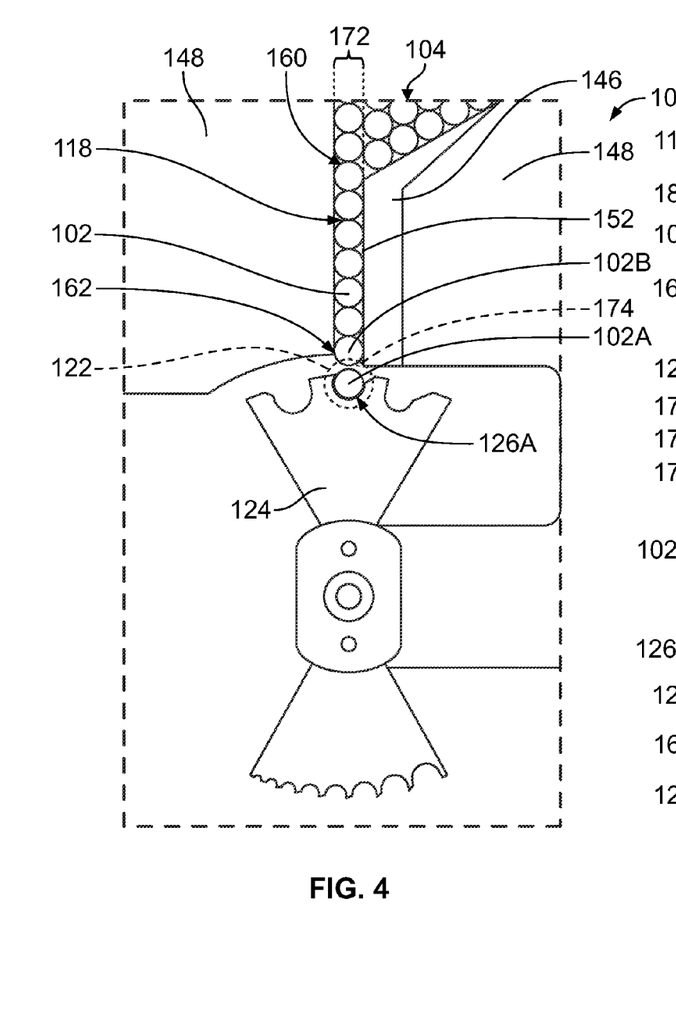
FIG. 4 is a front close-up view of the portion of the wire singulating device and the wire bundle shown in FIG. 3 according to an embodiment.

FIG. 4 is a front close-up view of the portion of the wire singulating device 106 and the wire bundle 104 shown in FIG. 3 according to an embodiment. In FIG. 4, the movable plate 146 is in the closed position, and the wire wheel 124 is in the reception position. Like FIG. 3, the wires 102 are shown in cross-section in FIG. 4. Once the first wire 102A enters the take away zone 122 and is received in the selected slot 126A of the wire wheel 124, the movable plate 146 is configured to move from the open position shown in FIG. 3 to the closed position shown in FIG. 4. The front plate 148 does not move with the movable plate 146. As the movable plate 146 moves toward the stationary plate 114, the width of the wire channel 118 decreases until the movable plate 146 reaches the closed position. At the closed position, the wire channel wall 152 of the movable plate 146 is separated from the stationary plate 114 by a second distance 172. The second distance 172 is referred to herein as being a second width 172 of the wire channel 118 that occurs when the movable plate 146 is in the closed position. The second width 172 of the wire channel 118 is narrower than the first width 164 (shown in FIG. 3) that occurs when the movable plate 146 is in the open position.

The location of the movable plate 146 in the closed position may be determined based on one or more properties of the wires 102 of the wire bundle 104, such as the diameter, the hardness of insulation layers (not shown), and the like. The movable plate 146 in the closed position is at a location that allows the movable plate 146 to engage at least the lowermost wire 102E in the wire channel 118 to retain the wires 102 in the wire channel 118. For example, the second width 172 of the wire channel 118 at least at a lower portion of the wire channel 118 (proximate to the bottom opening 162) may be slightly smaller than the diameter of the wires 102, so the movable plate 146 sandwiches and compresses at least the lowermost wire 102B between the wire channel wall 152 and the stationary plate 114. The lowermost wire 102B is retained in the wire channel 118 by a friction fit, and the wires 102 above the lowermost wire 102B are blocked from exiting the wire channel 118 by the wire 102B. In the illustrated embodiment, the wire channel wall 152 extends parallel to the stationary plate 114 and the wire channel wall 152 engages each of the wires 102 in the wire channel 118, not just the lowermost wire 102B. Other properties of the wires 102, such as hardness and compressibility, may be taken into account when determining the location of the movable plate 146 in the closed position. For example, the second width 172 may need to be slightly narrower for a harder wire than a softer wire in order to apply enough friction to secure the wire in the wire channel 118. In addition, the second width 172 may need to be slightly greater for a less compressible wire than a more compressible wire in order to ensure that the wire is not damaged by the forces exerted on the wire by the movable plate 146 and the stationary plate 114.

In an alternative embodiment, the wire channel wall 152 may be at least slightly angled relative to the stationary plate 114 such that a lower segment of the wall 152 proximate to the bottom opening 162 is closer to the stationary plate 114 than an upper segment of the wall 152 proximate to the top opening 160. The lower segment of the wall 152 is configured to engage at least the lowermost wire 102B to retain the lowermost wire 102B while the upper segment of the wall 152 does not engage at least some of the wires 102 above the lowermost wire 102B. The wires 102 above the lowermost wall 102B are retained in the wire channel 118 by the lowermost wire 102B that blocks the bottom opening 162. Optionally, the wire channel wall 152 of the movable plate 146 may include a projection 174 that extends from the wire channel wall 152 towards the stationary plate 114. The projection 174 is shown in phantom in FIG. 4 because it is an optional feature. When the movable plate 146 is in the closed position, the projection 174 extends at least partially under the lowermost wire 102B to block the wire 102B from falling through the bottom opening 162. The projection 174 may be used to retain the lowermost wire 102E instead of or in addition to sandwiching the wire 102B between the wire channel wall 152 and the stationary plate 114. In an alternative embodiment, the stationary plate 114, instead of the movable plate 146, includes a projection and/or is angled to retain the lowermost wire 102E in the wire channel 118 and block the other wires 102 above from exiting the wire channel 118.

Figure 5:
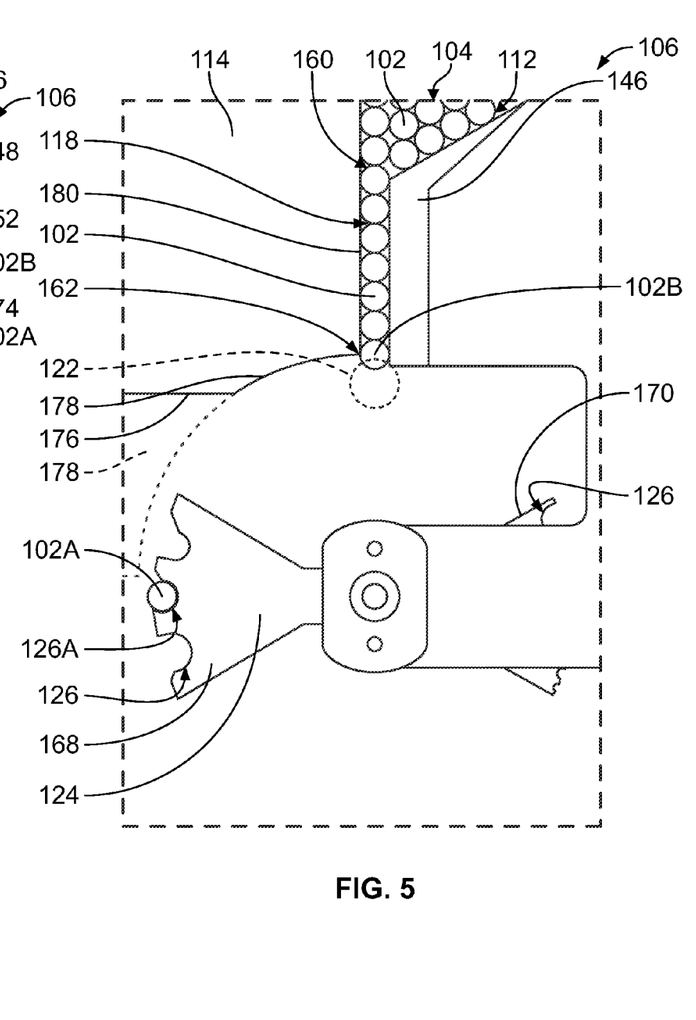
FIG. 5 is a front close-up view of the portion of the wire singulating device and the wire bundle shown in FIGS. 3 and 4 according to an embodiment.

FIG. 5 is a front close-up view of the portion of the wire singulating device 106 and the wire bundle 104 shown in FIGS. 3 and 4 according to an embodiment. In FIG. 5, the movable plate 146 is in the closed position and the wire wheel 124 is in a delivery position. The wires 102 are shown in cross-section in FIG. 5. Once the first wire 102A is received in the selected slot 126A of the wire wheel 124 and the movable plate 146 is in the closed position, the wire wheel 124 is configured to rotate to separate the wire 102A from the wire bundle 104. The movable plate 146 is in the closed position prior to the wire wheel 124 rotating in order for the second wire 102B and the other wires 102 in the wire channel 118 to be retained in the wire channel 118 by the movable plate 146. If the movable plate 146 were not in the closed position prior to the wire wheel 124 rotating, the wires 102 may fall through the wire channel 118 through the bottom opening 162 because the first wire 102A is no longer in the take away zone 122 to block the wires 102.

The wire wheel 124 rotates to the delivery position, at which orientation the selected slot 126A that has the first wire 102A therein is configured to deliver the wire 102A to a device or container for further processing. For example, the wire 102A may be delivered to a wire processing device (such as a terminator), a wire transfer device (such as the wire transfer device 108 shown in FIG. 1), a wire storage container, or the like. Since the wire wheel 124 rotates along a fixed axis, the delivery position is an arc length from the reception position shown in FIGS. 3 and 4. For example, the wire wheel 124 may be configured to rotate between 45° and 180° from the reception position to the delivery position. In the illustrated embodiment, the wire wheel 124 rotates counter-clockwise 90° from the reception position to the delivery position. In other embodiments, the wire wheel 124 may rotate clockwise instead of counter-clockwise to the delivery position.

In the illustrated embodiment, a bottom wall 176 of the stationary plate 114 includes a curved segment 178 that extends from an inner wall 180 of the stationary plate 114 that defines the wire channel 118. The curved segment 178 is concave to provide space for the wire wheel 124 and the wire 102A thereon to move relative to the stationary plate 114. The curved segment 178 is configured to avoid mechanical interference between the stationary plate 114 and the wire wheel 124 and/or the wire 102A on the wire wheel 124 as the wire wheel 124 rotates from the reception position to the delivery position. In an alternative embodiment shown in phantom in FIG. 5, the curved segment 178 may extend a substantial length of the arc length between the reception position and the delivery position. The curved segment 178 may also be configured to provide a retaining wall that blocks radial movement of the wire 102A to prevent the wire 102A from falling out of the selected slot 126A prematurely before reaching the delivery position.

After the first wire 102A is delivered to the device or container and the wire 102A is no longer within the slot 126A, the wire wheel 124 is configured to index back to the reception position in preparation for receiving the second wire 102B from the wire channel 118. The wire wheel 124 may move clockwise 90° so the same selected slot 126A aligns with the bottom opening 162 of the wire channel 118. Alternatively, the wire wheel 124 may continue to move counter-clockwise such that the wire wheel 124 only moves in one direction throughout the operation of the wire singulating device 106. For example, the wire wheel 124 may rotate 270° so the same slot 126A is used to receive the second wire 102B, or, if the wire wheel 124 includes another slot 126 of the same size and shape as the selected slot 126A on the opposite second wedge 170, then the wire wheel 124 may be configured to rotate counter-clockwise about 90° to return to the reception position. As such, the reception position and the delivery position of the wire wheel 124 are based on the locations of wires 102 when the wires 102 are received on the wire wheel 124 and removed from the wire wheel 124, respectively, and not based on the position of the wire wheel 124 itself. For example, the wire wheel 124 may be at the reception position with a slot 126 on the first wedge 168 aligned with the take away zone 122, and the wire wheel 124 may subsequently be at the reception position with a different slot 126 on the second wedge 170 aligned with the take away zone 122.

In an exemplary embodiment, the movable plate 146 remains in the closed position at least until the wire wheel 124 returns to the reception position. Subsequently, the movable plate 146 moves from the closed position to the open position such that the wire channel 118 widens. The lowermost wire 102 in the wire channel 118, which is the second wire 102B, exits the wire channel 118 through the bottom opening 162 and enters the take away zone 122, as described in FIG. 3. Thus, the operation shown in FIGS. 3-5 may repeat to separate the second wire 102B and the other wires 102 from the wire bundle 104 one at a time. As the wires 102 in the wire channel 118 move towards and eventually out of the bottom opening 162, space opens which allows wires 102 in the wire funnel 112 enter the wire channel 118 through the top opening 160. In an embodiment, the movable plate 146 may be configured to shuffle back and forth as the movable plate 146 moves from the closed position to the open position instead of moving in a constant direction. The shuffling of the movable plate 146 rapidly widens and narrows the wire channel 118 and at least a lower portion of the wire funnel 112, which agitates the wires 102 in the wire funnel 112. The agitation of the wires 102 in the wire funnel 112 allows the wires 102 of the wire funnel 112 to enter the wire channel 118 when space opens by breaking up groups of wires 102 that may plug the top opening 160 of the wire channel 118.

Figure 6:
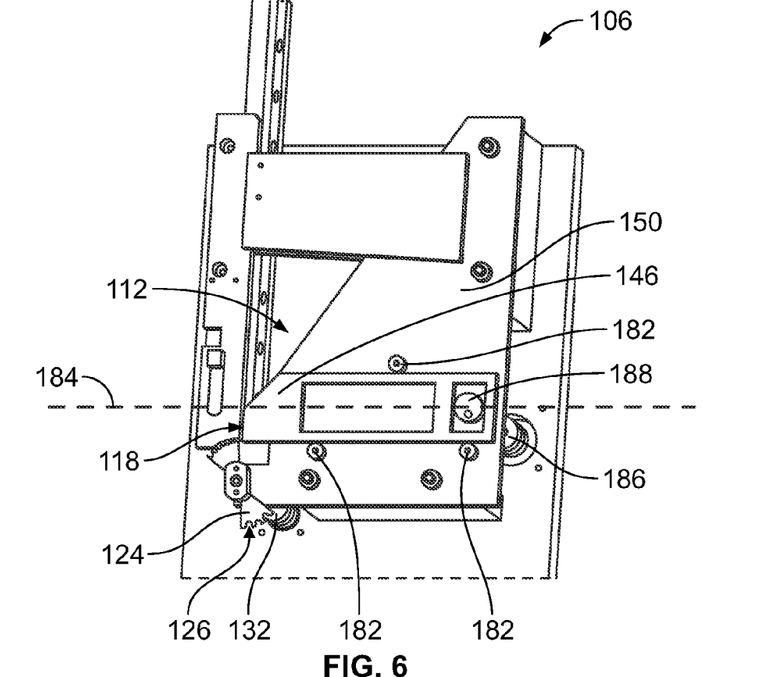
FIG. 6 is a perspective view of a portion of the wire singulating device according to an embodiment.

FIG. 6 is a perspective view of a portion of the wire singulating device 106 according to an embodiment. The front plate 148 (shown in FIG. 2) is removed in FIG. 6 for illustrative purposes. The back plate 150 includes multiple runners 182 that hold the movable plate 146 and guide the movable plate 146 between the open position and the closed position. Instead of, or in addition to runners 182, the back plate 150 may include an elongated track (not shown). In an embodiment, the movable plate 146 is configured to move linearly side-to-side along a horizontal axis 184. In an alternative embodiment, the movable plate 146 may move at least partially vertically in addition to moving side-to-side, such as in an elliptical pattern or a sinusoidal pattern. The vertical movement may provide additional agitation of the wires 102 (shown in FIG. 5) in the wire funnel 112 to allow the wires 102 to enter the wire channel 118.

The movable plate 146 is controlled by a motor 186. The motor 186 may be an electric stepper motor. The motor 186 may be coupled to the movable plate 146 via an eccentric 188 that is rotationally fixed to a shaft (not shown) of the motor 186. The eccentric 188 converts rotational movement of the motor 186 into linear reciprocating movement of the movable plate 146 between the open position and the closed position. The motor 132 that controls the wire wheel 124 may also be an electric stepper motor. The stepper motors 132, 186 are programmable such that the rotational speed, amounts, and stopping positions of the motors 132, 186 are controllable automatically based on programmed instructions. For example, a user of the wire singulating device 106 may enter wire properties, such as wire diameter, of the wires 102 (shown in FIG. 5) of the wire bundle 104 (FIG. 5) into the wire singulating device 106 via a control panel (not shown). Based on the input wire diameter, the motor 132 may control the wire wheel 124 to index to a specific position such that a slot 126 having a size configured to receive wires of the input diameter is aligned with the wire channel 118. Similarly, based on the input wire diameter, the motor 186 may control the movable plate 146 to move to an open position that produces a width of the wire channel 118 that is specific to the input diameter, such as one and a half times the input diameter. Likewise, the input diameter also may affect the motor 186 in controlling the closed position of the movable plate 146. Similar modifications may be made with respect to other input properties of the wires 102, such as wire hardness, number of wires 102 in the bundle 104, and the like. Thus, the wire singulating device 106 may operate automatically to separate individual wires 102 from the wire bundle 104, and the operation may be customized based on input information, such as wire properties.

Figure 7:
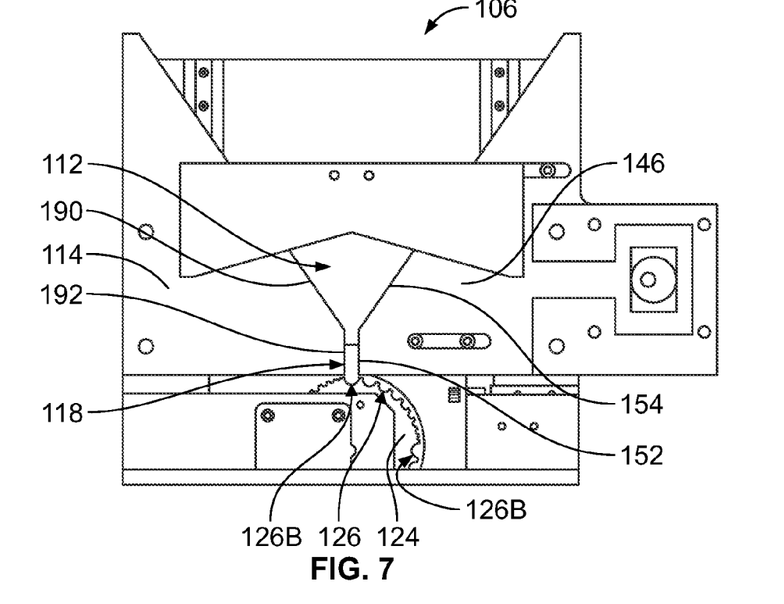
FIG. 7 is a front view of the wire singulating device according to an alternative embodiment.

FIG. 7 is a front view of the wire singulating device 106 according to an alternative embodiment. Like FIG. 6, the front plate 148 (shown in FIG. 2) is not shown in FIG. 6. In the illustrated embodiment, the stationary plate 114 has a wire funnel wall 190 and a wire channel wall 192 that are angled relative to each other, like the wire channel wall 152 and wire funnel wall 154 of the movable plate 146. As a result, the wire funnel 112 and the wire channel 118 are generally symmetric between the stationary plate 114 and the movable plate 146. The wire wheel 124 shown in FIG. 7 is circular. In addition to defining multiple slots 126 of different sizes and/or shapes for receiving wires of different sizes and/or shapes, the wire wheel 124 includes plural slots 126B that have the same size and shape as each other. The slots 126B allow the wire wheel 124 to rotate in a single direction and allow for subsequent wires to be received in different slots 126 having the same dimensions as the slots 126 that received prior wires 102.

Figure 8:
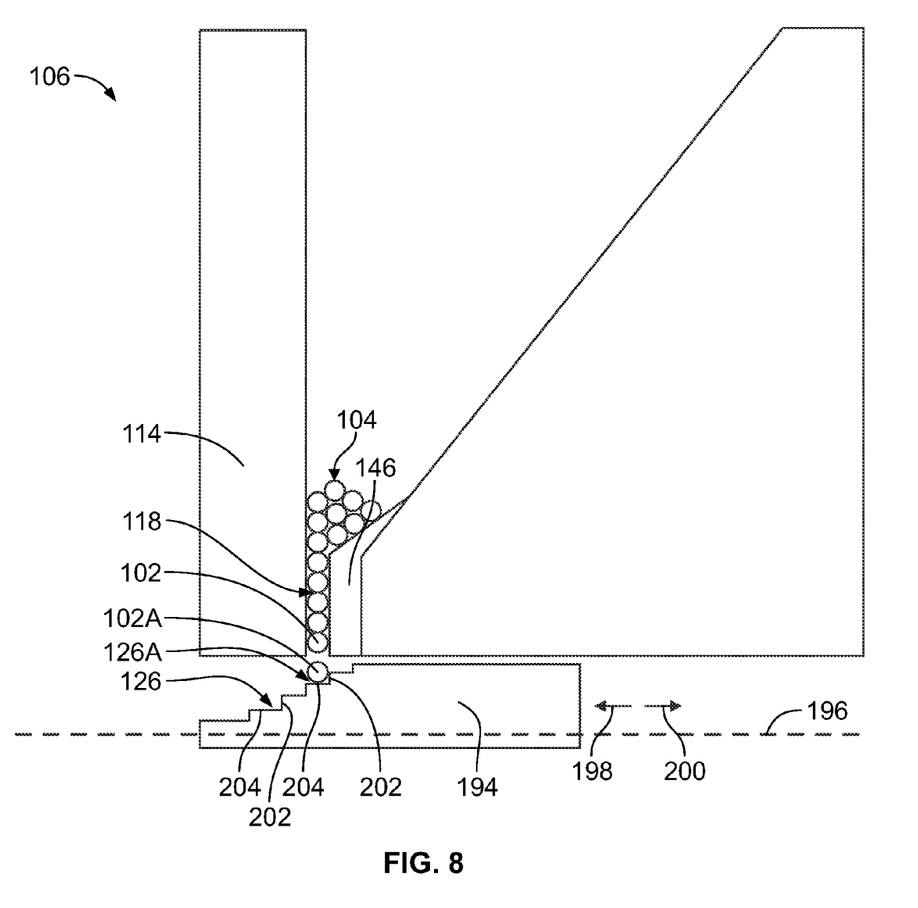
FIG. 8 is a front view of the wire singulating device according to another alternative embodiment.

FIG. 8 is a front view of the wire singulating device 106 according to another alternative embodiment. In FIG. 8, the wire transfer member 124 (shown in FIG. 1) is a wire block 194. The wire block 194 is configured to translate linearly relative to the stationary plate 114 and the movable plate 146 along a horizontal axis 196 to separate the wire 102A that is in the slot 126A from the wire bundle 104. For example, the wire block 194 reciprocates between moving in a singulating direction 198 and moving in an opposite, retreating direction 200. The wire block 194 shown in FIG. 8 is in a reception position such that a designated slot 126A is aligned with the wire channel 118. As the wire block 194 moves in the singulating direction 198, the wire block 194 carries the wire 102A in the slot 126A to a delivery position where the wire 102A is delivered to a wire processing device, a wire transfer device, a wire storage container, or the like. After delivering the wire 102A, the wire block 194 moves in the retreating direction 200 back to the reception position to receive another wire 102. The slots 126 in the wire block 194 may resemble steps that include a rise portion 202 and a run portion 204. The run portion 204 is below the wire 102 that is within the slot 126. The rise portion 202 is to the side of the wire 102 and applies a normal force on the wire 102 to propel the wire 102 in the singulating direction 198 as the wire block 194 moves to the delivery position. The wire block 194 may include multiple slots 126. The slots 126 optionally may have different sizes of rise portions 202 and/or run portions 204 in order to accommodate different sizes of wires 102.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112(f), unless and until such claim limitations expressly use the phrase "means for" followed by a statement of function void of further structure.

What is claimed is:

1. A wire singulating device comprising:
    a stationary plate and a movable plate defining a wire funnel and a wire channel therebetween, the wire channel disposed below the wire funnel, the wire funnel receiving a wire bundle that includes plural wires, the wire channel having a top opening that receives wires of the wire bundle from the wire funnel, the wire channel directing the wires one at a time to a take away zone below a bottom opening of the wire channel,
    wherein the movable plate is configured to be moved iteratively between a closed position and an open position to regulate the movement of the wires through the wire channel, the movable plate in the closed position located more proximate to the stationary plate than in the open position such that a width of the wire channel is less when the movable plate is in the closed position than when the movable plate is in the open position, the movable plate in the closed position engaging a lowermost wire within the wire channel to prevent the lowermost wire and other wires from exiting the wire channel through the bottom opening, the movable plate in the open position allowing the lowermost wire within the wire channel to exit the wire channel through the bottom opening and enter the take away zone; and
    a wire transfer member disposed below the bottom opening of the wire channel, the wire transfer member having a slot that aligns with the bottom opening and receives the wire that enters the take away zone when the movable plate is in the open position, the wire transfer member configured to move relative to the stationary plate and the movable plate to separate the wire that is in the slot from the wires in the wire channel.

2. The wire singulating device of claim 1, wherein, when the movable plate is in the open position, the wire that exits the wire channel and enters the take away zone blocks the other wires in the wire channel from exiting the wire channel through the bottom opening such that only one wire enters the take away zone.

3. The wire singulating device of claim 1, wherein the wire transfer member is configured to move only when the movable plate is in the closed position.

4. The wire singulating device of claim 1, wherein the movable plate is configured to shuffle back and forth as the movable plate is moved from the closed position to the open position.

5. The wire singulating device of claim 1, wherein the locations of the open and closed positions of the movable plate are selected based on a diameter of the wires of the wire bundle.

6. The wire singulating device of claim 1, wherein the width of the wire channel forces the wires in the wire channel into a single file line extending between the top opening and the bottom opening.

7. The wire singulating device of claim 1, wherein the movable plate has a wire channel wall that defines one side of the wire channel and a wire funnel wall above the wire channel wall that defines one side of the wire funnel, the wire funnel wall extending from the wire channel wall and angled away from the wire channel wall such that the wire funnel is wider than the wire channel and the wires of the wire bundle in the wire funnel are directed towards the wire channel.

8. The wire singulating device of claim 1, further comprising a weight that extends across the wire funnel between the stationary plate and the movable plate, the weight being movable relative to the stationary plate and the movable plate, the weight configured to engage the wire bundle in the wire funnel from above and apply a force on the wire bundle towards the wire channel.

9. The wire singulating device of claim 1, wherein the slot of the wire transfer member is one of plural slots defined in the wire transfer member, the plural slots having different sizes for receiving wires of different diameters.

10. The wire singulating device of claim 9, wherein the wire transfer member is programmable to align a corresponding one of the slots to the take away zone based on the diameter of the wires.

11. The wire singulating device of claim 1, wherein the wire transfer member is a wire wheel, the wire wheel configured to rotate relative to the stationary plate and the movable plate to separate the wire that is in the slot from the wire bundle.

12. The wire singulating device of claim 1, wherein the wire transfer member is a wire block, the wire block configured to translate linearly relative to the stationary plate and the movable plate along a horizontal axis to separate the wire that is in the slot from the wire bundle.

13. The wire singulating device of claim 1, further comprising a motor operatively coupled to the movable plate and configured to iteratively move the movable plate between the open position and the closed position according to programmed instructions.

14. The wire singulating device of claim 1, wherein the movable plate has a wire channel wall that defines one side of the wire channel, the wire channel wall when the movable plate is in the closed position sandwiches the lowermost wire in the wire channel against the stationary plate to prevent the lowermost wire and the other wires in the wire channel from exiting the wire channel through the bottom opening.

15. A wire singulating device comprising:
a stationary plate and a movable plate defining a wire funnel and a wire channel therebetween, the wire channel disposed below the wire funnel, the wire funnel receiving a wire bundle that includes plural wires, the wire channel having a top opening that receives wires of the wire bundle from the wire funnel, the wire channel directing the wires to a take away zone below a bottom opening of the wire channel;
a motor operatively coupled to the movable plate and configured to iteratively move the movable plate relative to the stationary plate from a closed position to an open position according to programmed instructions to control a width of the wire channel,
wherein, the movable plate in the closed position engages a first, lowermost wire in the wire channel to retain the first wire and other wires from exiting the wire channel through the bottom opening, the width of the wire channel increasing as the motor moves the movable plate from the closed position to the open position, the movable plate in the open position allowing the first wire to exit the wire channel through the bottom opening and enter the take away zone; and
a wire wheel disposed below the bottom opening of the wire channel, the wire wheel having a slot that aligns with the bottom opening when the wire wheel is in a reception position to receive the first wire that enters the take away zone, the wire wheel configured to rotate relative to the stationary plate and the movable plate away from the reception position to separate the first wire in the slot from the wires in the wire channel.

16. The wire singulating device of claim 15, wherein, when the movable plate is in the open position and the wire wheel is in the reception position, the first wire in the slot blocks a second wire adjacent to the first wire from exiting the wire channel through the bottom opening such that only one of the wires exits the wire channel and enters the take away zone at a time.

17. The wire singulating device of claim 15, wherein the wire wheel is configured to rotate away from the reception position to separate the first wire in the slot from the wires in the wire channel only when the movable plate is in the closed position.

18. The wire singulating device of claim 15, wherein the width of the wire channel forces the wires in the wire channel into a single file line extending between the top opening and the bottom opening.

19. The wire singulating device of claim 15, wherein the slot of the wire wheel is one of plural slots defined in the wire wheel, the plural slots having different sizes to accommodate wires of different diameters.

20. The wire singulating device of claim 15, wherein the motor is configured to move the movable plate from the closed position to the open position only when the wire wheel is in the reception position.

* * * * *